Figure 1:
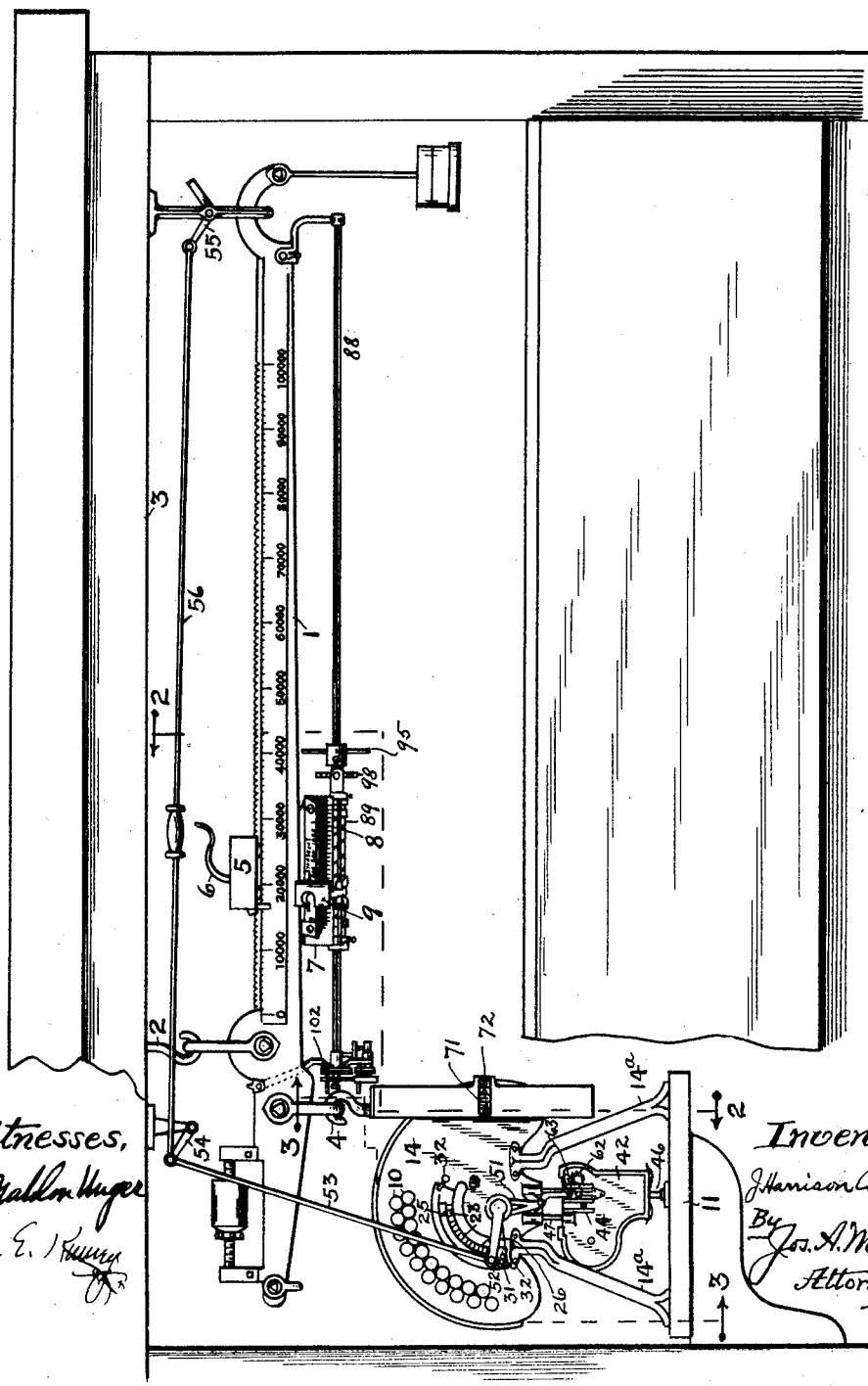

No. 776,117. PATENTED NOV. 29, 1904.
J H. CURTIS.
REGISTERING DEVICE FOR WEIGHING SCALES.
APPLICATION FILED JULY 28, 1903.
NO MODEL. 9 SHEETS—SHEET 2.

Witnesses,
Mahlon Unger

Inventor,
J Hanson Curtis
By J A Minturn
Attorney

No. 776,117. PATENTED NOV. 29, 1904.
J. H. CURTIS.
REGISTERING DEVICE FOR WEIGHING SCALES.
APPLICATION FILED JULY 28, 1903.
NO MODEL. 9 SHEETS—SHEET 3.

Witnesses
S. Mahlon Unger
Collie E. [illegible]

Inventor
J Harrison Curtis
By Joseph A. Minturn
Attorney

No. 776,117. PATENTED NOV. 29, 1904.
J. H. CURTIS.
REGISTERING DEVICE FOR WEIGHING SCALES.
APPLICATION FILED JULY 28, 1903.
NO MODEL. 9 SHEETS—SHEET 4.

Witnesses
S Mahlon Unger
Ollie E. Rumsey

Inventor,
J Harmon Curtis
By Jos. A. Minturn,
Attorney.

No. 776,117. PATENTED NOV. 29, 1904.
J H. CURTIS.
REGISTERING DEVICE FOR WEIGHING SCALES.
APPLICATION FILED JULY 28, 1903.
NO MODEL. 9 SHEETS—SHEET 5.

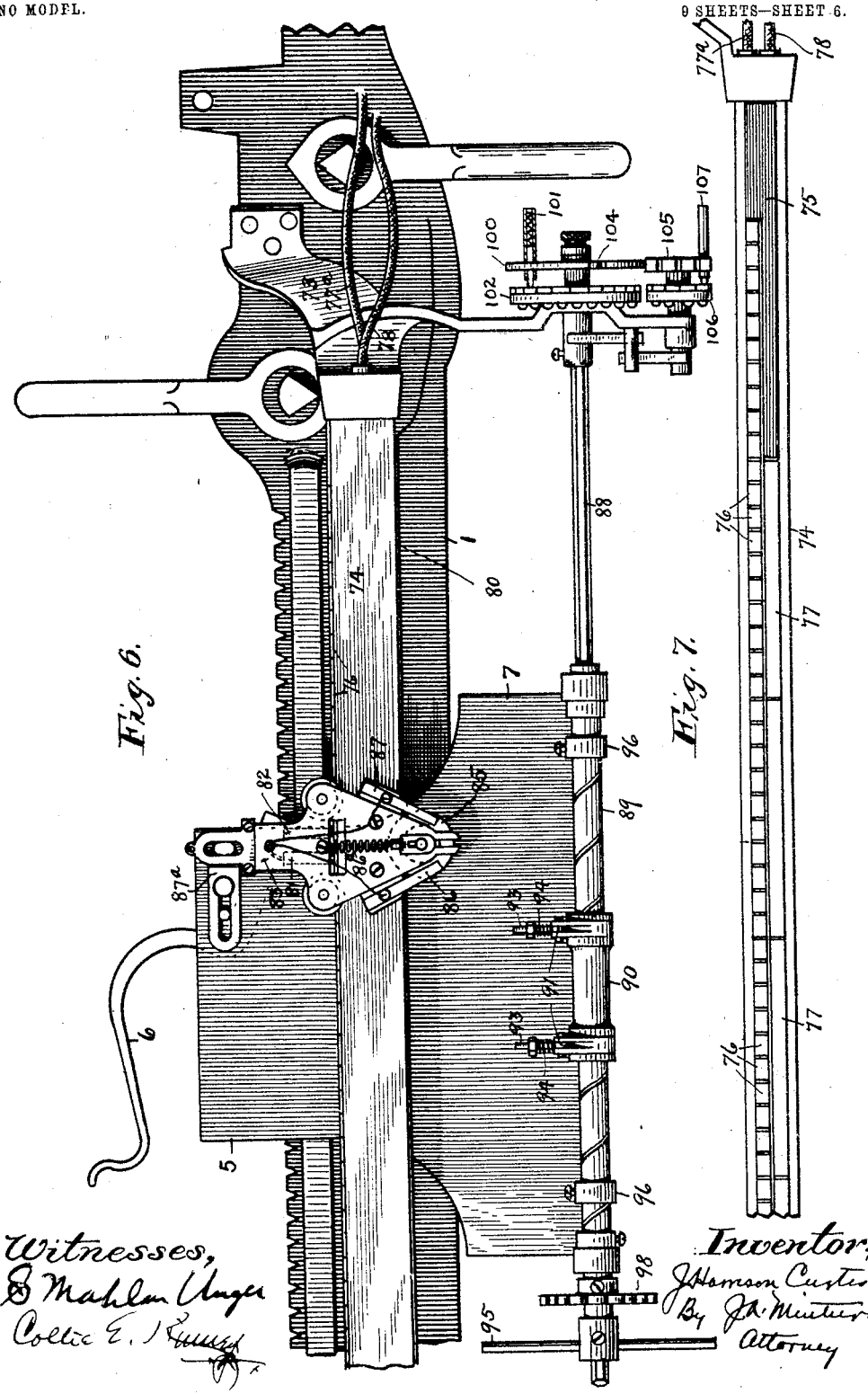

No. 776,117. PATENTED NOV. 29, 1904.
J. H. CURTIS.
REGISTERING DEVICE FOR WEIGHING SCALES.
APPLICATION FILED JULY 28, 1903.
NO MODEL. 9 SHEETS—SHEET 7.
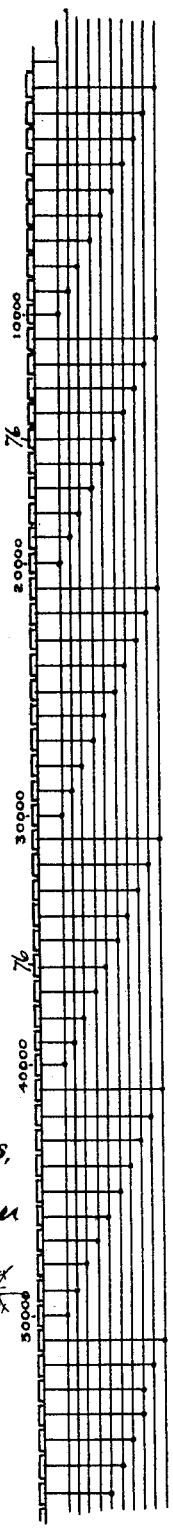
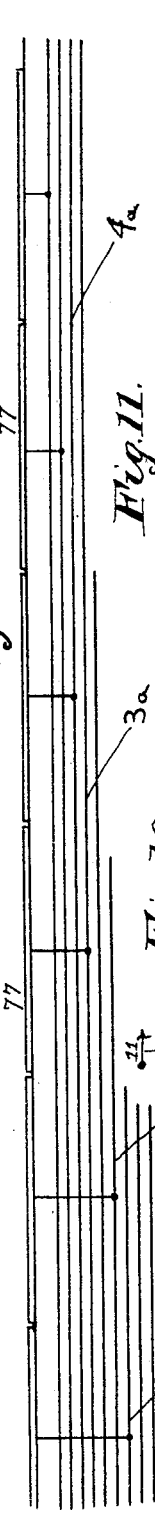
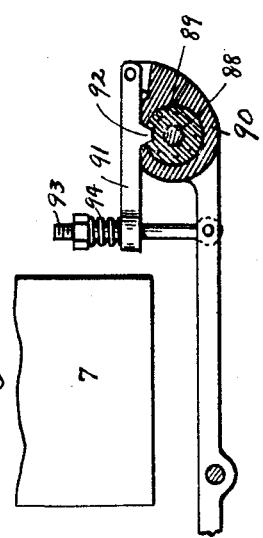
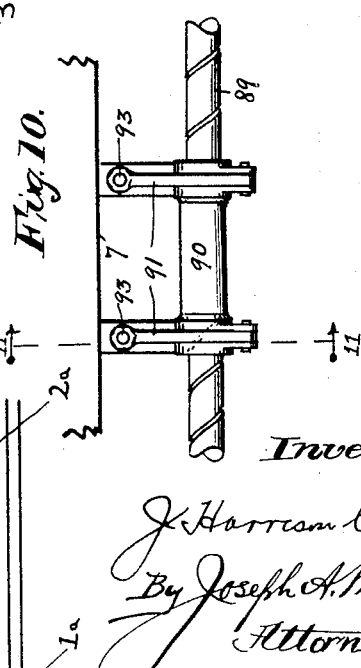

No. 776,117. PATENTED NOV. 29, 1904.
J H. CURTIS.
REGISTERING DEVICE FOR WEIGHING SCALES.
APPLICATION FILED JULY 28, 1903.
NO MODEL. 9 SHEETS—SHEET 8.
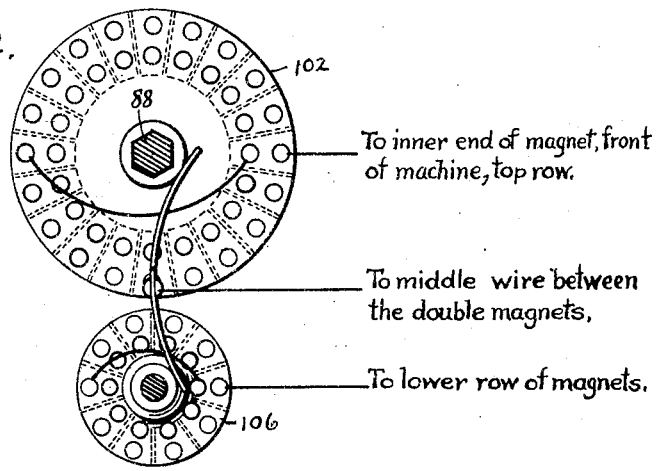
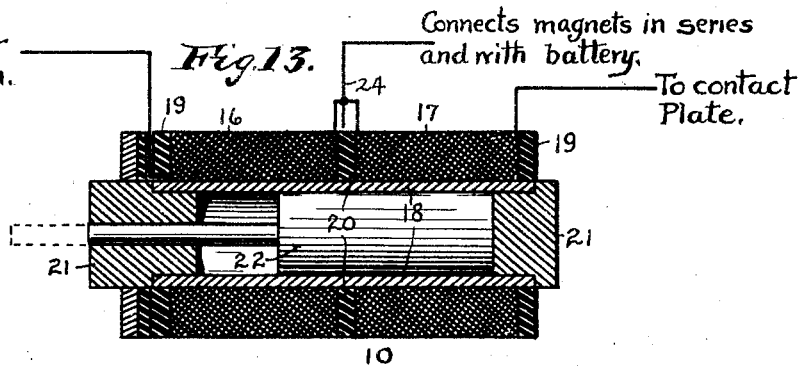
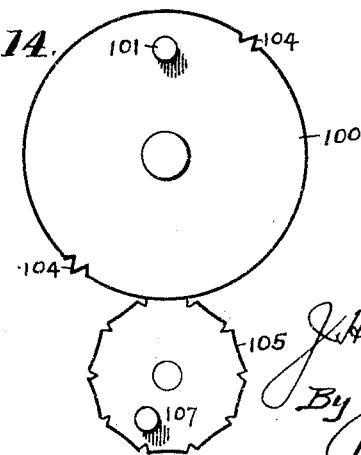

No. 776,117. PATENTED NOV. 29, 1904.
J. H. CURTIS.
REGISTERING DEVICE FOR WEIGHING SCALES.
APPLICATION FILED JULY 28, 1903.
NO MODEL. 9 SHEETS—SHEET 9.
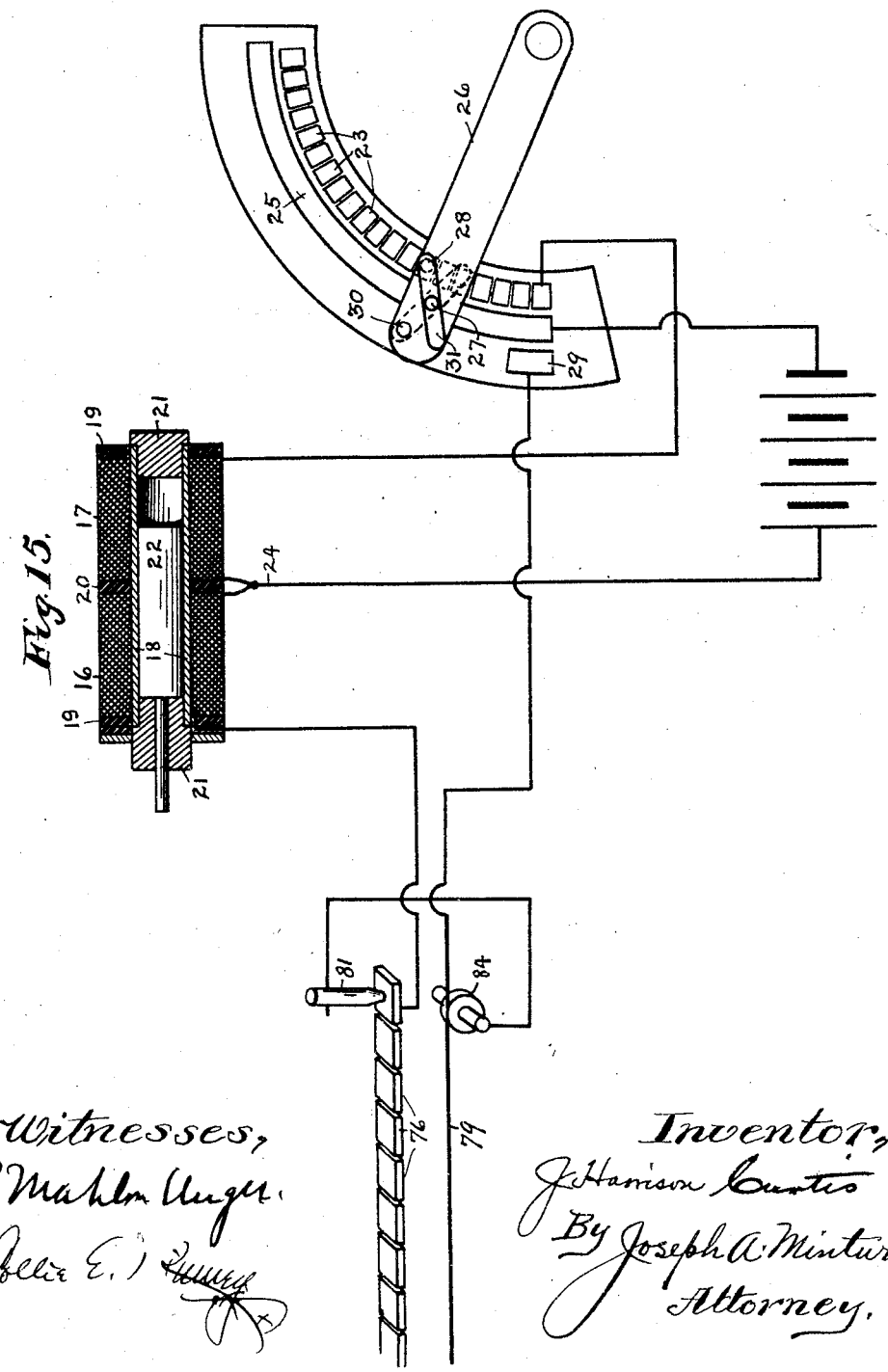

No. 776,117. Patented November 29, 1904.

UNITED STATES PATENT OFFICE.

J. HARRISON CURTIS, OF INDIANAPOLIS, INDIANA, ASSIGNOR TO HENRY D. LANE AND NATHAN KAHN, OF INDIANAPOLIS, INDIANA.

REGISTERING DEVICE FOR WEIGHING-SCALES.

SPECIFICATION forming part of Letters Patent No. 776,117, dated November 29, 1904.

Application filed July 28, 1903. Serial No. 167,362. (No model.)

*To all whom it may concern:*

Be it known that I, J. HARRISON CURTIS, a citizen of the United States, residing at Indianapolis, in the county of Marion and State of Indiana, have invented certain new and useful Improvements in Registering Devices for Weighing-Scales, of which the following is a specification.

The object of this invention is to provide a weighing-scale with a recording mechanism by means of which a permanent record of the amount of each weighing may be made.

Another object is to provide a mechanism of this kind that will make each record upon a suitable recording strip or tape and at the same time display the reading in visible characters independent of and for the verification of the usual readings of the scale-beams, but connected with the printing characters, so as to express their value for verification by the operator with the readings of the scale-beams before the permanent record is made.

Another object of the invention is to simplify the mechanism and render it more reliable and positive by the adaptation of an electric current as an operative means.

The invention consists in the peculiar and novel construction, arrangement, and combination of parts hereinafter described and then specifically pointed out in the claims, reference being had to the accompanying drawings, forming a part of this specification.

Figure 2:
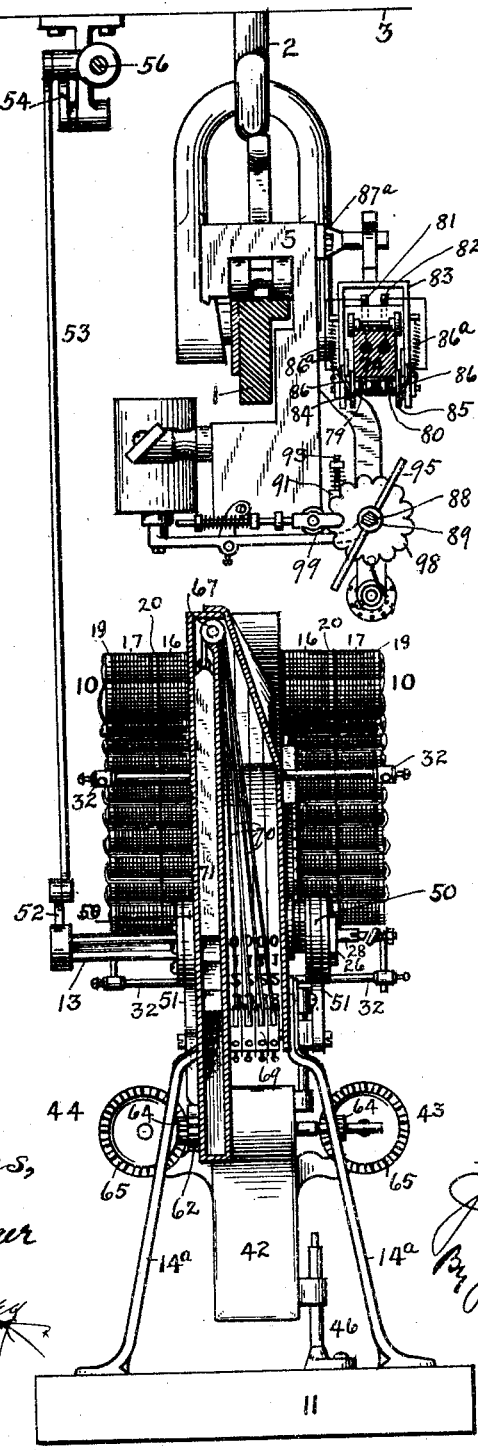
Figure 3:
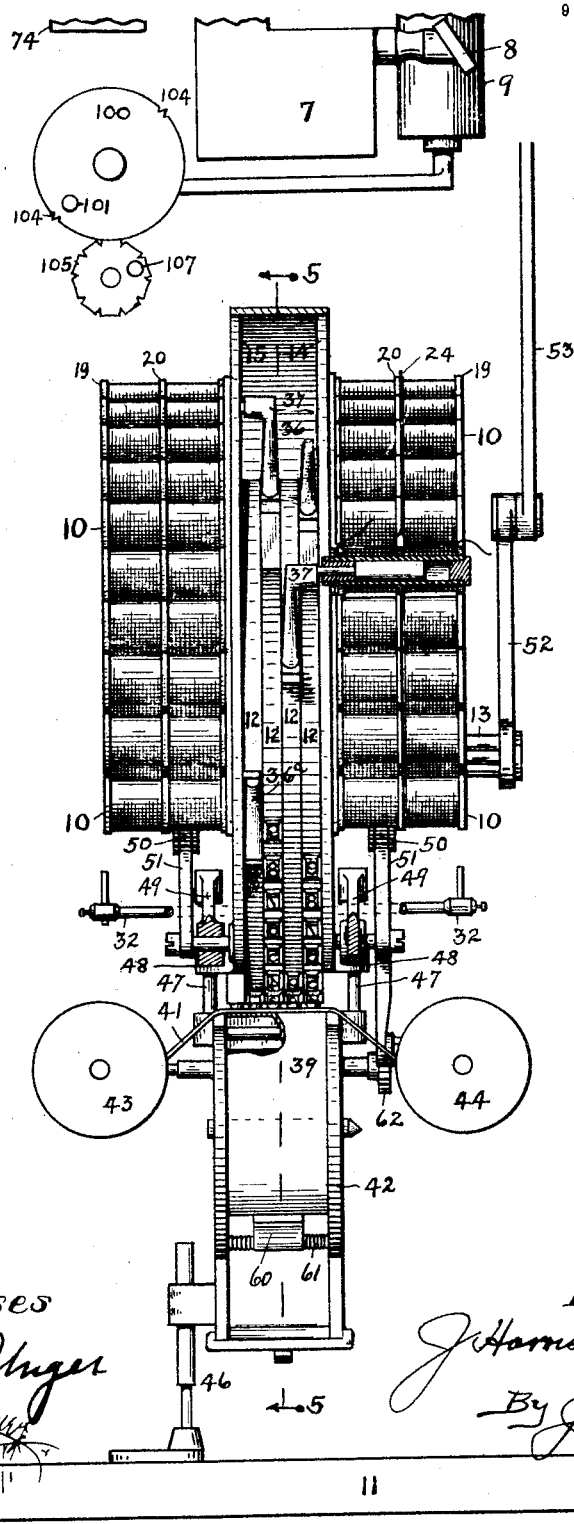
Figure 4:
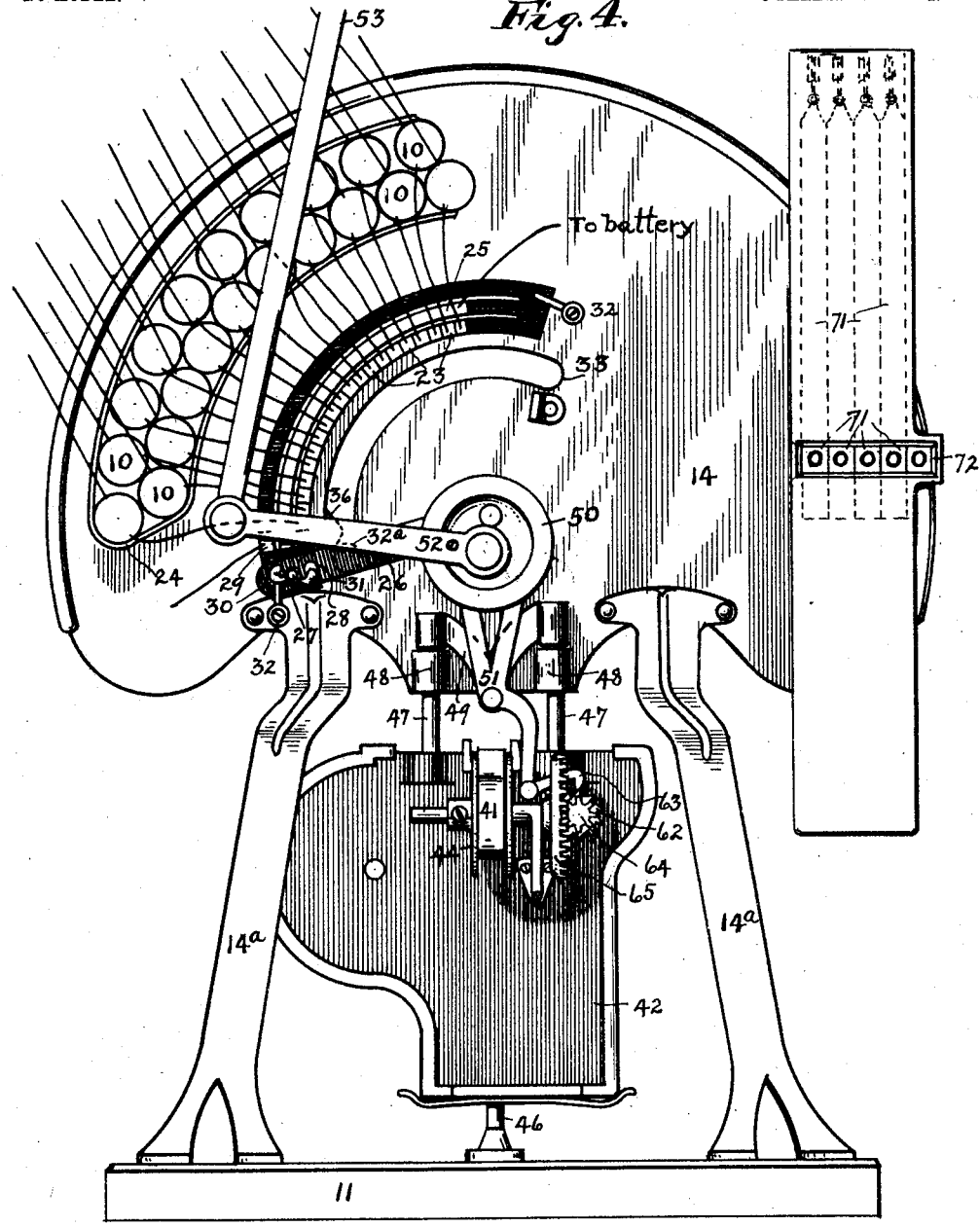
Figure 5:
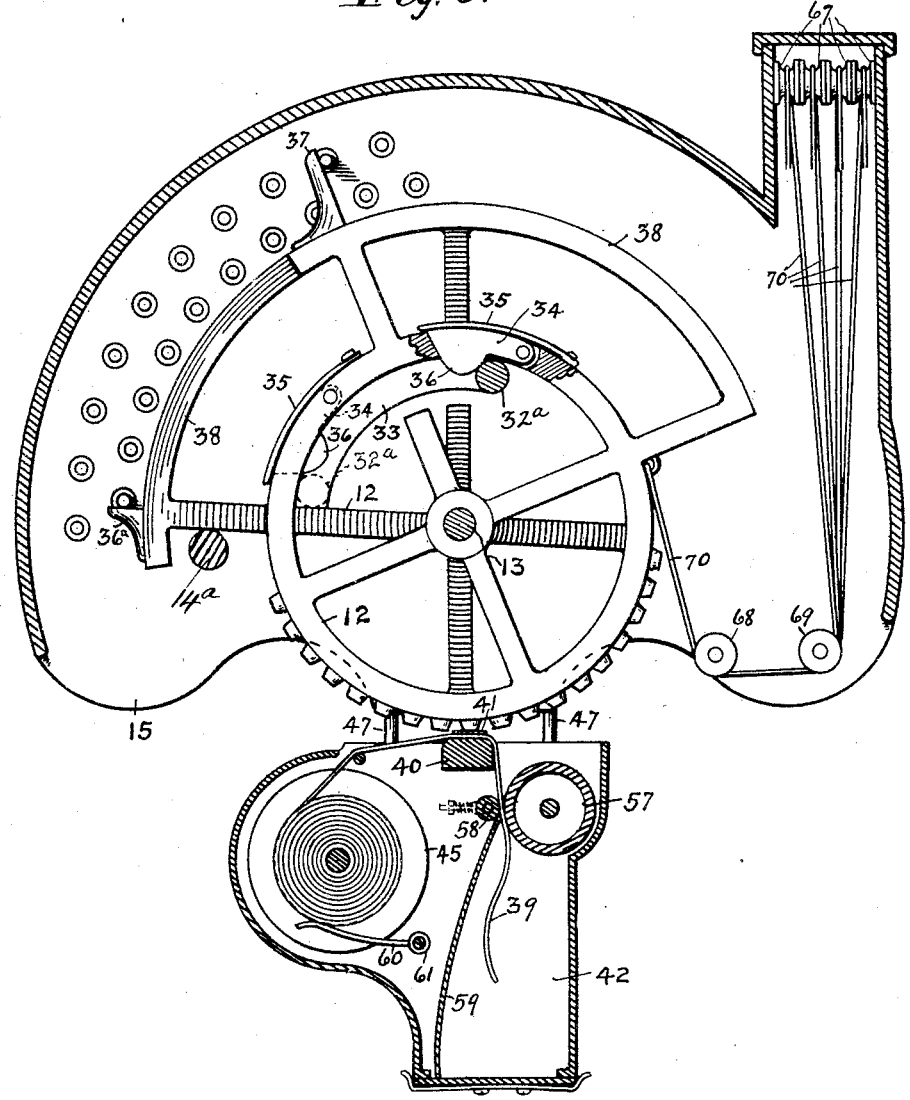

In the accompanying drawings, in which like parts are indicated by like characters of reference, Figure 1 is a comprehensive view, in side elevation, of a scale-beam fully equipped with this invention, the view being from a point in front of the scale; Fig. 2, a section on the line 2 2 of Fig. 1 looking in the direction of the arrows; Fig. 3, a section on the line 3 3 of Fig. 1 looking in the direction of the arrows; Fig. 4, a front view of the recording-machine on a larger scale than that on which the same is shown in Fig. 1. Fig. 5 is a section on the vertical line 5 5 of Fig. 3. Fig. 6 is a detail of the scale-beam with my invention applied thereto viewed from the rear of the said beam; Fig. 7, a detail in top view of the commutator-rod which extends longitudinally of the scale-beam. Figs. 8 and 9 are diagrams showing the manner of wiring the contact-plates of said commutator. Fig. 10 is a plan view of the connections between the poise on the short or hundreds beam and the threaded screw which operates it. Fig. 11 is a section of same on the dotted line 11 11 of Fig. 10. Fig. 12 is a rear view of the circular commutator which operates in conjunction with the small poise on the auxiliary or hundreds beam. Fig. 13 is a longitudinal section of one of the magnets used for throwing the stops of the recording-machine. Fig. 14 is a front view of the locking-disks to control the commutator shown in Fig. 12, and Fig. 15 is a diagram showing the system of wiring used in electrically connecting up the parts of this invention.

Referring to the drawings, 1 represents the scale-beam, of usual construction, which is graduated in thousands from "0" up to "100,000." It is suspended from the hook 2, supported by the frame 3, and has connection through the hook-bolt 4 with the platform-levers. (Not shown.)

5 is a carriage which is mounted upon suitable rollers bearing upon the top of the scale-beam and is adjustable longitudinally of said beam in adjusting the scale. It has the locking-lever 6, by which its position is positively retained at any desired position of the scale-beam, and depending from the carriage, preferably integral with it and having its greatest mass underneath the scale-beam, is the weight 7, which, with the carriage, forms the "counterweight" of the scale and will hereinafter be referred to as such. Supported from the front side of this counterweight is the auxiliary graduated beam 8, on which is the sliding poise 9. The auxiliary beam is graduated from "0" up to "1,000" in a ratio of ten to each graduation, and a weight or portion thereof under one thousand is balanced by adjusting the poise 9 on the auxiliary beam 8.

All of the mechanism thus far described is in common use and well known, and the primarily novel features of this invention consist of means for automatically transmitting the readings of the two graduated beams to a registering device and the recording of the readings of the register in printed characters on a suitable tape or paper strip.

The registering device above referred to will first be described and then the mechanism by which it is operated from the scale-beam.

The registering device is supported on a base 11, which is suitably supported from the frame 3 of the scale. A plurality of type-wheels 12, depending in number upon the capacity of the scale and here shown as four in number, are centrally mounted on a common axle 13 between two parallel plates 14 and 15. These plates, which are rigidly connected by suitable transverse members, which, if desired, may assist in forming a closure for said type-wheels, are supported by legs 14$^a$, which rest upon the base 11. The lower peripheries of the type-wheels have printing characters or numerals from "0" to "9" on their lower peripheries, and the four wheels shown in the drawings represent weights from "0" to "100," "100" to "1,000," "1,000" to "10,000," and "10,000" to "990,000," respectively. This number may be increased or diminished proportionately as the capacity of the scale requires.

Mounted on the outer sides of the plates 14 and 15 are the electromagnets 10, there being one for each of the printing characters of the four disks, or a total of forty of said magnets. Each of these magnets, as shown in Figs. 3, 13, and 15, have double windings of wire 16 and 17 upon a single metal sleeve 18. The windings have the insulations 19 19 at their outer ends, and they are separated from each other by the insulation 20. The ends of the bore of the sleeve 18 are closed by the cores 21 21, between which is the movable core-piece or armature 22, of less length than the space of said sleeve-bore between the stationary core-pieces 21 21. The outer end of the wire-winding of the outer magnet of this double magnet connects with a contact-plate 23, mounted adjacent to said magnet on the same face of the plate on which said magnet is mounted. There is one of these plates 23 for each of the twenty double magnets of the respective plates 14 and 15, and they will preferably be arranged in an arc of a circle in the manner shown for reasons which will be presently explained. The wire from the winding at the end of the inner magnet next to the carrying-plate is connected with a commutator on the scale-beam or adjacent thereto, hereinafter to be described, and the inner or adjacent ends of the two windings are connected with a wire 24, which connects all of the magnets in series and which is itself connected with a suitable current-generating battery, as indicated in the diagram Fig. 15.

The series of contact-plates 23, heretofore referred to, is mounted on suitable material to insulate each plate from the rest of the machine, and the several contact-plates are separated from each other sufficiently to break the electrical circuit between them. Mounted on the same insulation as plates 23 and sufficiently removed to prevent electric flow is the metal plate 25, extending the full length of the series of said plates and adjacent thereto. This plate 25 is connected up electrically with the opposite pole of the battery from that to which the magnets are connected.

Pivoted to the axle on which the type-wheels 12 are mounted are the arms 26 26, one on each end of said axle, (only one of which is shown,) the outer ends of which arms are of insulating or non-electrical-conducting material. Two electrical brushes 27 and 28 are mounted in the insulated portions of each arm, so that when the arm sweeps the arc occupied by the contact-plates 23 and plate 25 the brush 27 will make electrical contact with the plate 25 and the brush 28 like contact successively with the plates 23. The position of each of said arms 26 between the registering of each balancing of the scale is at the lower end of the series of plates 23 and adjacent plate 25, which position may be regarded as the normal one for said arms. Opposite the lower end of plate 25, on the opposite side thereof from the plates 23, is a comparatively short metal plate 29, which is electrically connected by suitable wire with one of the wires of the commutator at the scale-beam. The arms 26 each have a third brush, 30, between brush 27 and the outer end of said respective arm, and pivotally mounted on brush 27 is a metal conductor 31. As shown in Fig. 15, the position of brush 27 is at one side of the line between brushes 28 and 30, so that said conductor 31 may by oscillation be brought successively into contact with brush 28 or 30, but not with both at once. Posts 32, stationed at each end of the travel of arms 26, are provided with fingers which contact with conductor 31 and move it into a new position. The travel of said arms exceeds the limits of the plates 23, 25, and 29 sufficiently, as shown, to break all electric connections between the brushes carried by the arms and said plates.

The arms 26 on each side of the casing formed by the plates 14 and 15 are connected by means of a rod 32$^a$, which passes through slots 33 in said side plates provided for that purpose. The rims of the type-wheels 12 are provided with slots in which levers 34, one for each wheel, are pivotally secured at one end of said levers. The free ends of the levers contact with the end of the slot in which each respective lever is located, so as to determine the inward movement of said lever, and the outward movement is restrained by means of a spring 35, which presses the lever into its normal inward position. The free end of each lever has an inwardly-projecting lug 36 with oblique or inwardly-sloping edges. When the arms 26 are moved upwardly from their lower normal position, their connecting-bar 32ª contacts with the lugs 36 of the respective type-wheels and moves said wheels until they are stopped by a resistance, which causes the rod 32ª to overcome the spring of the lever carrying that lug and causes the lug to move out of the path, allowing the rod 32ª to pass. On the return movement of the arms the rod 32ª carries the type-wheels back to normal position for said wheels, which position is reached before the rod has reached the limit of its travel, and the further travel of the rod forces the lugs out of the way, allowing said rod to take its normal position under them.

The arrest of the type-wheels is occasioned by contact of portions projecting from said wheels with the pins thrown out by the magnets 16 into the paths of said type-wheel projections. These projections are shown at 36ª for the outer type-wheels, Figs. 3 and 5, and at 37 for the two middle or inner wheels. The latter have lateral end extensions which reach over the outer wheels into contact with the pins of the upper rows of magnets. The projections 36ª and 37 will preferably be supported and strengthened by the segmental extensions 38 from said wheels.

The type-wheels are held in normal position and from return movement when stopped by the pins by friction produced by clamping their hubs tightly together on shaft 13. The return movement of the wheels is checked when the normal position is reached by contact with the cross-bolt 14ª, which connects plates 14 and 15.

The magnet-pins by reason of their magnets being connected up in a suitable manner electrically with the scale-beams will be moved into the paths of projections 36 and 37, so as to arrest the type-wheels at their right positions, respectively, to present the type-numeral of said disk which represents the graduation of the scale-beam sought to be registered on the tape at the bottom of the type-wheel, and a means which will now be described will move a platen 40, over which a paper strip or tape 39 is drawn, up against the said lower type-numerals. An inked ribbon 41 will be interposed between the paper and the face of the type, thereby causing a printed impression of the bottom row of types to be impressed on said paper.

42 is a case which supports the platen 40 at its open upper end, and within the case a drum 45, on which the paper-supply is wound, is mounted. Supported by the case on the outside of it are the two drums 43 and 44, from the one to the other of which the ribbon 41 is alternately wound. The case 42 is guided in its vertical movement by the guide 46 at its bottom and the four guide-rods 47 at its top. The latter are rigidly secured to the top of the case and pass through openings in lugs 48, which are integral with the sides 14 and 15. The rods are connected at their tops in pairs by the yokes 49.

Mounted on the ends of axle 13 are the eccentric disks 50, surrounding which are suitable rings which have the lever extensions 51, which connect with wrist-pins on the yokes 49. The disks 50 are mounted in a fixed manner on the axle, so both will move together. Fastened rigidly to the disk is an arm 52, which, as shown in Fig. 1, is connected by rod 53 with the free end of the pivoted arm 54. Connecting the same free end of arm 54 with the usual locking-lever 55 at the outer end of the scale-beam is the rod 56, having a handle by which the rod is moved longitudinally to lock the beam after each balancing of the scale. By the mechanism shown and described this same movement of rod 56 to lock the scale moves the arm 52 of disk 50 in an upward direction, whereby the movable case 42, with its platen, paper, and ribbon, is simultaneously moved up against the types, the type-wheels having just been brought to position against the arresting-pins by the arms 26, also mounted on and moving with said axle and the previously-described parts which operate in conjunction with said arms 26. Located within the case 42, as shown best in Fig. 5, is a feed-roll 57, and mounted adjacent to it and pressed thereto by suitable springs is the smaller roller 58. Between these rollers the strip of paper is fed, and the rotation of roller 57 will cause the paper to be drawn over the platen a suitable distance between each time of making an impression. 59 is a spring-plate which forms a partition to keep the printed end of the slip from crowding back and mixing up with the supply on the drum. The feed-out or speed of the latter is controlled by the plate 60, which presses by the tension of springs 61 against the unrolled paper on the drum.

The shaft on which the feed-roll 57 is mounted is hollow. At one of its ends, outside of case 42, is mounted a ratchet-wheel 62. One of the lever extensions 51, connecting with and oscillated by one of the eccentrics, is extended and provided with the hook 63, which engages the ratchet-wheel 62 at each revolution of the controlling-eccentric, thereby revolubly moving said hollow shaft and moving the feed-roll mounted thereon. Mounted in said hollow shaft, with ends projecting on each side of case 42, is a shaft having pinions 64 64, Fig. 2. By moving the shaft bearing these pinions longitudinally the pinion on the end toward which the movement is made will be brought into engagement with the side teeth of wheels 65 65, respectively mounted on the shafts carrying drums 43 or 44. By shifting this rod in proper direction the ribbon can be made to wind from whichever spool is fullest upon the one which is the emptiest.

As a means for verifying the readings of the type-wheels with the readings of the scale-beams before the former are printed on the paper strip a vertically-elongated closure is provided at the front of the registering device, having communication at its top with the space between plates 14 and 15 and having four pulleys 67 mounted opposite said communicating opening within the closure. Between the plates 14 and 15, near the bottom of said plates, are the pulleys 68 and 69. Cords 70 are fastened at one of their ends to the type-wheels, as shown in Fig. 5, and are passed thence under the pulleys 68 and 69 and thence over the pulleys 67 and are then made fast to weight-bars 71, which are four in number and have numerals on their outer faces from "0" to "9." The closure which surrounds these bars is provided with a transverse slot-opening 72 just wide enough to expose a single line of the numerals on the weight-bars to view. The numbers on the weight-bars are spaced the same distance apart as those on the type-wheels with which the bars are connected by the cords, and as the type-wheels revolve their cords are reeled out or in, as the case may be, thereby correspondingly raising or lowering the numbered weight-bars and presenting the numbers on them to view through the opening 72.

At the back of the scale-beam 1, supported from it by suitable brackets 73, (see Fig. 6,) and running parallel therewith is a bar 74, principally of wood, having a top insulation 75, upon which is a longitudinal row of separated metal plates 76—one for each of the notches or graduations of the scale-beam. These plates (shown in Figs. 7, 8, and 15) are connected with ten wires after the manner shown in Fig. 8. Regarding the said plates as being numbered from "0" to "9" in successive groups, all of the No. 0 plates are connected with the No. 0 horizontal wire below it, the No. 1 plates of the several series with the No. 1 horizontal wire, the No. 2 plates with the No. 2 wire, and so on. These horizontal wires are incased within the bar 74, and after leaving the bar are assembled in the cable 77ª. The latter runs to the registering device, where the wires are separated and are connected with the inner ends of the top row of magnets at the back of the machine, the "0" wire being connected to the top magnet, No. 1 wire to the second magnet from the top of the row, and so on to the end. Also mounted on the insulation on tip of bar 74 are the plates 77, which extend unbrokenly from the "0" to the "9" plate of the sets just described, there being one of these plates 77 for each of said sets of ten plates. The plates 77 are connected with four underlying horizontal wires in the manner shown in Fig. 9, in which the first plate is connected with wire No. 1ª, the second plate with wire No. 2ª, the third plate with wire No. 3ª, and the fourth plate with wire No. 4ª, this order of wiring being repeated for the entire lot of plates. The horizontal wires are carried in cable 78 to the registering-machine, where they are divided and connected with the inner end of the lower row of magnets on the front plate 14, the No. 1 wire connecting with the second magnet from the top of the lower row. Running along the bottom of bar 74 longitudinally thereof are the conductors 79 and 80, which connect up with plate 29 on the register. Mounted on suitable rollers on bar 74 and adapted to travel longitudinally of said bar is the carriage 83. This carriage is connected with the counterweight-carriage 5 by means of a suitable arm, whereby both will move together. The carriage 83 has a block of insulating or non-conducting material in which are mounted the two brushes 81 and 82, which bear, respectively, upon plates 76 and 77. The sides of the carriage 83 extend below the bar 74 and have vertical slots from their lower ends, in which are adjustably mounted the wheels 84 and 85. These wheels are conductors and are insulated from each other and from the carriage. They bear upwardly by the force of springs 86ª against their respective adjacent conductors 79 and 80. Metal brushes 86 and 87, a pair like these being provided for each side of the carriage 83, are carried by but insulated from the carriage. The pair on each side of the carriage is connected electrically with its adjacent brush 81 or 82 and with its adjacent wheel 84 or 85 as the case may be.

The above-described construction, attached to the back of the scale-beam, comprises what has been referred to as a "commutator" in this specification.

The arm which fastens the carriage 83 to the carriage 5 has the longitudinally-slotted foot 87ª, through the slot of which the foot is secured to the carriage 5 in a manner that permits of adjustment of the carriage 83 to cause the brushes of the carriage to contact with the proper plates to correspond correctly with the graduation of the scale-beam, which is engaging the locking-lever 6.

The commutator for the auxiliary beam 8 is located permanently at the inner end of the scale-beam, and its changes are effected by the rotation of a hexagonal rod 88, running full length of beam 1 and supported therefrom by suitable brackets in a manner to allow rotary but not longitudinal movement of said rod. The plates of this commutator are arranged in a circle on disks secured in a fixed manner to the inner bracket. Rotary brushes moved by the rotation of the hexagonal rod 88 sweep the commutator-plates. It is believed the drawings Figs. 6, 12, and 14 illustrate this construction, taken with the description of the commutator for the beam 1, so that little additional description is required therefor.

Mounted on the hexagonal rod 88, so as to rotate therewith but having movement longitudinally thereof, is the sleeve 89, which is connected with the weight 7 of the counterweight, so as to be moved longitudinally of the rod 88 whenever the counterweight 5 7 is moved on scale-beam 1. The outer face of the sleeve is provided with double spiral grooves of a very coarse pitch, as shown in Fig. 6, and mounted on sleeve 89 is a sleeve 90, having arms at each end which pass under the counterweight 7 and connect with the poise 9 on the auxiliary beam 8. Pivoted to suitable extensions at the ends of sleeve 90 are levers 91, having under-side lugs 92, which pass through openings in the sleeve 90 into the grooves of sleeve 89. An elastic and regulative pressure of the said levers is secured by bolts 93, attached to arms running from sleeve 90 to the poise 9, which pass through eyes in said levers and are secured by nuts on the threaded upper ends of the bolts. Springs 94 are interposed between the nuts and the levers.

The sleeve 89 has radial bars 95 at one end for engagement by the fingers of the person who is adjusting the scale. By the rotation of the sleeve 89 in this manner the poise 9 is moved on its beam to a balance. The possible travel of the sleeve 90 on the sleeve 89 is limited by a pair of stops 96, which are fastened to sleeve 89 by means of set-screws to enable their positions to be changed in adjusting this part of the scale, it being the purpose to have the sleeve 90 travel over the distance between said stops in the same time that the poise is moving from one end of its graduated beam to the other. A brake-wheel 98 with peripheral notches to engage a spring-pressed roller 99 (see Fig. 2) is provided to assist in gaging the movement of the sleeve and to prevent accidental displacement.

At the commutator end of rod 88 is the disk 100, which carries the brush 101. The disk 100 rotates with the rod, and its brush makes contact with the conducting-plates on the insulating-disk 102. The conducting-plates are electrically connected with the proper magnets of the registering device.

It is desirable to have as coarse a pitch of thread on sleeve 89 as possible to facilitate the quick and easy adjustment of the small poise 9 by hand. In the drawings the relation of the pitch of the thread to the number of contact-plates on commutator-plate 102 is such as to cause a half-turn of the hexagonal rod 88 to cause brush 101 on disk 100 to sweep half of the contact-plates on plate 102 or from "0" to "9." A second set of plates from "0" to "9" completes the circuit on disk 100. These plates are duplicated in this manner for convenience, so as to enable a continuous adjustment of the poise to be had without reversing the adjustment.

The plates of the same value of the two sets of plates are wired together, and said plates from "0" to "9" are electrically connected with the bottom row of magnets at the back or plate 15 of the register.

The disk 100 has two diametrically opposite teeth 104, which engage suitable notches in an intermittent gear 105, mounted on the same shaft with a commutation-wheel 106. The wheel 105 carries a brush 107, which makes contact with plates numbered from "0" to "9" on insulated wheel 106. The latter plates are electrically connected with the inner end of the top back row of magnets on plate 15 of the register. Plates 100 and 105 and their brushes are electrically connected with the plate on the back of the indicator corresponding to plate 29. (Shown on the front plate 14.)

In the operation of weighing, the counterweight 7 and poise 9 both being at "0," the counterweight 7 is moved out on its beam to as near a balance as is obtainable, after which a correct balance is made by moving the poise 9 by rotating the screw-sleeve 89. Electrical connection at the two scale-beams is made with the wires leading to the proper pins carried by the armature 22 to stop the printing-wheels, so the types indicating the amount weighed will be alined in right printing position. The reading of the scale-beams is verified by the reading through the slot-opening 72, and if found to agree the printed record is made by throwing the arm 52 up as far as it will go. This movement of the arm 52 throws the locking-lever 55 down to lock the beam and also completes the electric circuit, so that the magnets which control the stop-pins for the given weight are magnetized and the pins moved into the paths of the printing-wheels. With the completion of the upward movement of arm 52 the reciprocating means for taking the printed impression from the said wheels is operated. The return or downward movement of the arm 52 returns the printing-wheels to their lower normal positions, magnetizes the electromagnets, which withdraw the pins from the paths of the printing-wheels, and unlocks the scale-beams, leaving all of the parts in right position for the next weighing.

Having thus fully described my invention, what I claim as new, and wish to secure by Letters Patent, is—

1. In a recording apparatus for scales, type-wheels, means for moving said wheels, said type-wheels having portions to be engaged by stops to arrest the wheels, metal tubes having double windings of wire insulated from each other, core-pieces at each end of said tube filling a portion only of the interior of said tube, an armature movably mounted in the tube between the core-pieces said armature having a pin which projects through an opening in one of the core-pieces, and means for alternately electrifying the two magnet-windings so as to impart a reciprocatory movement longitudinally of the tube to the armature thereby causing it to move its pin into the path of the type-wheels or back as the case may be.

2. In a recording apparatus for scales, type-wheels, means for moving said wheels, said type-wheels having portions to be engaged by suitable stops or pins, electromagnets in pairs with both of their windings on a common sleeve, a battery connected with both of the adjacent or inner ends of the two magnet-windings, core-pieces at the ends of said sleeve, an armature movable between the core-pieces within said sleeve, said armature having a pin adapted to be moved out so as to stop the type-wheels and back out of contact therewith by reversing the order of excitement of the magnets, a conducting-plate connected with the battery, a second conducting-plate connected electrically with the outer end of the outer magnet, a scale-beam, a poise movable thereon, a commutator operated in conjunction with the poise to complete an electric circuit at a given position of the poise, a commutator-brush connected with the inner end of the inner magnet-winding, a third conducting-plate adjacent to the first but on the opposite side from the second plate, said third plate electrically connected with said commutator, brushes for each of the three conducting-plates, and an adjustable conductor adapted to connect the brush of the first plate alternately with the brush of the other two plates, the connection being between the brushes of the first and third plates to move the pin into position to stop the type-wheel and between the first and second to withdraw the pin.

3. In a recording apparatus for scales, type-wheels, pins to intercept and stop said wheels, means for moving said wheels, double magnets to longitudinally reciprocate the pins, a scale-beam, a poise movable thereon, a commutator operated by the adjustment of the poise, a battery, a middle and two other adjacent conducting-plates, all of said parts being electrically connected, brushes for each of the three conducting-plates and an adjustable conductor adapted to make electrical connection between the brush of the middle plate and one or the other of the said other brushes.

4. In a recording apparatus for scales, type-wheels, means for moving said wheels, a plurality of pins to stop the wheels, a battery, electromagnets in pairs, a pair for each pin, to longitudinally reciprocate the pins, said magnets being connected with each other and with the battery, a commutator connected with the winding of one of the magnets of each pair of magnets, a plate connected with the commutator, second plates, one for each pin, connected with that magnet of each pair that is not connected with said commutator, said second plates being in a circular segment, a third plate coextensive with the series of seconds and between the latter and said first plate said third plate being connected with the battery, brushes for the three sets of contact-plates, means for causing them to sweep all of said plates and means for connecting one or other of said side plates with the middle one but not both therewith at one time.

5. In a recording apparatus for scales, type-wheels, means for moving said wheels, magnets, pins moved by said magnets, a commutator, a battery, a triple set of contact-plates connected as shown with the commutator, magnets and battery, said plates being in rows which are segments of circles, an arm pivoted at the center of said circle, a brush for each of said three sets of contact-plates, carried by said arm, means for connecting the middle brush with one of the other brushes and for reversing the order of said connection, and means at each end of the travel of said arm for reversing the order of contact between the middle brush and the two side brushes.

6. In a recording apparatus for scales, type-wheels loosely mounted on a common axle, rims for said wheels having longitudinal slots, levers pivoted in each of said slots, having lugs projecting inwardly from the wheel-rims, springs to press said levers inwardly and means contacting with the lugs for moving the wheels.

7. In a recording apparatus for scales, type-wheels loosely mounted on an axle, said axle, arms mounted in a fixed manner on the axle and connected by a bar passing through suitable openings through the wheels and movable lugs yieldingly secured in the path of the bar connecting the arms.

8. In a recording apparatus for scales, type-wheels loosely mounted on a common axle, said wheels having transverse openings, said axle, arms mounted in a fixed manner on the axle, there being one arm on each side of the wheels, a bar passing through the transverse openings of the wheels and connecting the arms, levers having outwardly-tapering lugs said levers being pivotally secured so the lugs will enter the transverse openings of the wheels and engage the bar connecting the arms and springs to yieldingly retain the levers in position with their lugs in the path of said bar.

9. In a recording apparatus for scales, type-wheels, cables connected therewith and wound upon the peripheries of the wheels, bars suspended from said cables having characters corresponding with those of the type-wheels, a closure surrounding said bars, said closure having an orifice through which only a single horizontal row of the characters of the bars can be seen at one time.

10. In a recording apparatus for scales, said scale, an axle, type-wheels mounted thereon having raised types on their peripheries, means for moving the type-wheels, so a given row of types will express the reading of the scale, a reciprocating frame having movement to and from the given row of type and means connected with the axle for reciprocating the frame to make a printed impression of the type of said row.

11. In a recording apparatus for scales, an axle, type-wheels mounted thereon having raised types on their peripheries, means for moving the type-wheels, stops to arrest the wheels so a given row of types will express the reading of the scale, a frame having a reciprocatory adjustment to and from the given row of type, eccentrics on the axle and means connecting the eccentrics with the frame for reciprocating the press so as to make a printed impression of the type of that row.

12. In a recording apparatus for scales, an axle, type-wheels mounted thereon having raised types on their peripheries, means for moving the type-wheels, stops to arrest the wheels so a given row of types will express the reading of the scale, a frame having a reciprocating movement to and from the given row of type, said frame comprising a platen, a drum on which a supply of paper in the form of a ribbon is wound said ribbon passing from the drum over the platen, a pair of rolls between which the ribbon is fed, and an inked ribbon passing between the paper and the type, an eccentric on the axle, and means for actuating the frame and its mechanism therefrom.

13. In a recording apparatus for scales, an axle, type-wheels mounted thereon having raised types on their peripheries, means for setting the wheels so a given row of types will represent the reading of the scale, a frame having reciprocating movement to and from said row of type, said frame having a spool of paper which paper passes from the spool over the platen, a pair of rolls to draw the paper over the platen, the shaft of one of said rolls having a ratchet-wheel, an inked ribbon passing over the paper, an eccentric on said axle, an eccentric-ring surrounding the eccentric said ring having an arm which is pivotally secured to a pin moving with the frame, said arm being extended beyond the pivot and having a hooked end to engage the teeth of the ratchet-wheel on the roller-shaft.

14. In a recording apparatus for scales, an axle, type-wheels mounted thereon having raised types on their peripheries, means for setting the wheels so a given row of types will represent the reading of the scale, a frame having reciprocating movement to and from said row of type, a roll of paper in said frame, a platen over which the paper passes, a roller on the opposite side of the platen from the supply-roll of paper said roller having a sleeve with ends extended outside of the frame, an inked ribbon passing transversely over the paper, spools on each side of the frame to and from which the ribbon is alternately wound, gear-wheels on the spool-shafts, a shaft passing through the roller-sleeve said shaft having a pinion at each end one of which alternately meshes with the gear-wheel on the corresponding end of a spool-shaft, a ratchet-wheel on the roller-sleeve, an eccentric on the type-wheel shaft, a ring surrounding said eccentric said ring having an arm which is pivoted to a post moving with the frame, said arm having an extension terminating with a hook which engages the ratchet-wheel at each oscillation of the arm thereby moving the ribbon and the feed-roller, and a second feed-roller between which and the first the paper passes.

15. In a recording apparatus for scales, an axle, type-wheels mounted thereon, a frame having reciprocating movement to and from the bottom of the type-wheels, said frame having a platen and a roll of paper which paper is fed over the platen and said frame having an inked ribbon which is fed transversely of the paper between it and the type-wheel, an eccentric on the type-wheel shaft, a ring around the eccentric having an arm which is pivotally secured to the frame said arm having an extension, and means whereby the arm will feed the ribbon and the paper at each reciprocation of the frame.

16. In a recording apparatus for scales, an axle, type-wheels mounted thereon, a frame having reciprocating movement to and from the type-wheels, said frame having a platen, a drum on one side having a roll of paper, a brake to check the rolling out of the paper said paper passing from the drum over the platen, a pair of feed-rollers, one mounted on a hollow sleeve and the other mounted in spring-pressed boxes, means for regulating the pressure of the springs to control the pressure against the other roller, the paper from the platen being fed between the rollers, a ratchet-wheel on said roller-sleeve, a shaft passing through said sleeve said shaft having a pinion at each end, spools on each side of the frame, an inked ribbon passing over the paper on the platen and wound alternately from one spool to the other, the spool-shafts having gear-wheels with side teeth to be engaged by the pinions of the roller-shaft, a partition between the paper-supply drum and the feed-rollers, eccentrics on the ends of the type-wheel axle, eccentric-rings operating therewith and having arms which are pivotally secured to the frame, one of said arms being extended below the pivot and having a hook formation to engage the ratchet-wheel by the oscillation of the arm.

17. In a recording apparatus for scales, a scale-beam, a poise movable thereon to balance the scale, a register having stops, electromagnets operating said stops, a commutator having contact-plates electrically connected with said magnets and brushes movable with the poise for completing the circuit at the required part of the commutator.

18. In a recording apparatus for scales, a plurality of type-wheels having types from 0 to 9, said wheels revolving on a common axle, electrically-operated stops to arrest the wheels so their type in a given line will together give the reading of the scale, a scale-beam, a poise movable thereon, a commutator having a plurality of series of contact-plates, each series having plates from 0 to 9, the plates of the same denomination of the commutator and the stops of the same value of the type-wheels being electrically connected, and means moving with the poise for completing the circuit at the required part of the commutator.

19. In a recording apparatus for scales, a plurality of type-wheels having types from 0 to 9, said wheels revolving on a common axle, electrically-operated stops to arrest the wheels so their type in a given line will together give the reading of the scale, a scale-beam, a poise movable thereon, a commutator having contact-plates arranged in circular order, said plates being electrically connected with said stops, a rotary disk, a brush to sweep the contact-plates said brush carried by said disk, a shaft on which the disk is mounted, means for rotating the shaft, a sleeve mounted on the shaft so as to rotate therewith and having longitudinal movement thereon, said sleeve having a screw-thread on its periphery, a sleeve mounted on said first sleeve having projections to engage the thread of the other sleeve and connecting means between the said second sleeve and poise whereby a rotation of said shaft will move the poise.

20. In a recording apparatus for scales, a poise, a scale-beam carried by said poise, a second poise adjustable on said scale-beam, a register, having electrically-operated stops therefor, a commutator having contact-plates arranged in a circle, said plates being electrically connected with said stops, a rotary moving brush to contact with said commutator-plates, and means connected with the second poise and with the brush for moving both simultaneously.

21. In a recording apparatus for scales, a poise, a scale-beam on which said poise is moved to balance the scale, an auxiliary beam carried by said poise, a second poise movable on said auxiliary beam, a register, having type-wheels revolubly mounted therein, and having electrically-operated stops to arrest the type-wheels at desired positions, a commutator having plates arranged in a circle said plates being electrically connected with the said stops, a rod having motion of rotation only, a disk mounted in a fixed manner on said rod, a brush to sweep the contact-plates of the commutator carried by said disk, a sleeve mounted on the rod so as to rotate therewith and also having longitudinal adjustment thereon said sleeve having peripheral spiral grooves, means for rotating the sleeve by hand and for regulating the extent of said movement, a second sleeve mounted on the first and having projections to enter the spiral grooves and means connecting the second sleeve with the second poise.

In witness whereof I have hereunto set my hand and seal, at Indianapolis, Indiana, this 29th day of June, A. D. 1903.

J. HARRISON CURTIS. [L. S.]

Witnesses:
NATHAN KUHN,
H. D. LANE.